(12) United States Patent
Potel et al.

(10) Patent No.: US 11,066,997 B2
(45) Date of Patent: Jul. 20, 2021

(54) FLUID CIRCUIT IN A TURBINE ENGINE

(71) Applicant: Safran Aircraft Engines, Paris (FR)

(72) Inventors: Nicolas Alain Bernard Potel, Moissy-Cramayel (FR); Lancelot Guillou, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 152 days.

(21) Appl. No.: 16/469,213

(22) PCT Filed: Dec. 13, 2017

(86) PCT No.: PCT/FR2017/053536
§ 371 (c)(1),
(2) Date: Jun. 13, 2019

(87) PCT Pub. No.: WO2018/109374
PCT Pub. Date: Jun. 21, 2018

(65) Prior Publication Data
US 2019/0390602 A1 Dec. 26, 2019

(30) Foreign Application Priority Data
Dec. 14, 2016 (FR) ...................................... 1662441

(51) Int. Cl.
*F02C 7/14* (2006.01)
*F01M 5/00* (2006.01)
*F02C 7/06* (2006.01)

(52) U.S. Cl.
CPC ............... *F02C 7/14* (2013.01); *F01M 5/002* (2013.01); *F01M 5/007* (2013.01); *F02C 7/06* (2013.01);
(Continued)

(58) Field of Classification Search
CPC .. F02C 7/14; F02C 7/06; F01M 5/002; F01M 5/007; F01M 2205/004; F05D 2220/32;
(Continued)

(56) References Cited

U.S. PATENT DOCUMENTS 3,034,770 A 5/1962 Hiersch
3,390,719 A * 7/1968 McCallister ............. C10G 9/20
165/296
(Continued)

FOREIGN PATENT DOCUMENTS

GB 2485653 A 5/2012
WO WO 2013/178956 A1 12/2013

*Primary Examiner* — Steven M Sutherland
(74) *Attorney, Agent, or Firm* — Blank Rome LLP

(57) ABSTRACT

An assembly for a turbine engine having an oil circuit. The oil circuit includes an air/oil heat exchanger, a primary bypass pipe connecting an intake of the air/oil heat exchanger to an outlet of the air/oil heat exchanger and surrounding the air/oil heat exchanger so as to exchange heat with the air/oil heat exchanger. The oil circuit further includes and a secondary bypass pipe of the primary pipe connecting the upstream end of the primary bypass pipe to the downstream end of the primary bypass pipe. The oil circuit also includes at least one valve for controlling the passage of the flow of oil into the primary and secondary bypass pipes and means for controlling the opening of said at least one valve for a temperature lower than a threshold temperature.

7 Claims, 3 Drawing Sheets

(52) U.S. Cl.
CPC ... *F01M 2005/004* (2013.01); *F05D 2220/32* (2013.01); *F05D 2260/213* (2013.01); *F05D 2260/232* (2013.01)

(58) Field of Classification Search
CPC .......... F05D 2260/213; F05D 2260/232; F28F 2250/06; F28F 27/02; F28D 2021/0021; F28D 1/0417
USPC ........ 165/297, 280, 283, 284, 103, 110, 122
See application file for complete search history.

(56) References Cited

U.S. PATENT DOCUMENTS

| | | | | |
|---|---|---|---|---|
| 4,254,618 | A | * | 3/1981 | Elovic ................. F28D 21/0014 60/226.1 |
| 2012/0125594 | A1 | * | 5/2012 | Elder ..................... F28F 17/00 165/300 |

* cited by examiner

FLUID CIRCUIT IN A TURBINE ENGINE

CROSS-REFERENCE TO RELATED APPLICATIONS

This application is a national stage of International Application No. PCT/FR2017/053536, filed on Dec. 13, 2017, which claims the benefit of French Patent Application No. 1662441, filed on Dec. 14, 2016, the contents of each of which are incorporated by reference herein.

The present invention relates to an oil circuit as well as to a turbine engine equipped with such an oil circuit.

Like all internal combustion engines, turbine engines, whether turbojet or turboprop engines, include moving parts that rub against other moving parts or against stationary parts.

In order not to break due to heating due to friction, the parts are sprayed with oil which makes it possible to limit (or contain) their heating and, on the other hand, to lubricate them to facilitate the sliding of the parts one on top of the other.

The oil flows in a circuit 10 provided with heat exchangers, in particular oil/air exchangers 12, as shown in FIG. 1, having a matrix 14, in the form of a sinuous pipe shaped so as to achieve heat exchange, into which the oil from said parts is introduced and then cooled before being injected again onto said parts.

When starting a turbine engine in cold conditions (e.g. with a temperature below 0° C.), the oil in the matrix 14 of the air/oil exchanger 12 (or exchangers if applicable) can be frozen, making heat exchange between oil and air difficult or impossible since the oil cannot circulate in the matrix 14 of the exchanger 12. It is then necessary to preheat the matrix 14 of the air/oil heat exchanger 12 beforehand.

For this purpose, it is known to provide the air/oil heat exchanger 12 with a bypass pipe 16 used as a defrosting channel and surrounding the matrix 14 of the air/oil heat exchanger 12 in order to heat the frozen oil. This bypass pipe 16 is connected at its upstream end to the intake 18 of the heat exchanger 12 and the outlet 20 of the heat exchanger 12. The oil circuit 10 also includes a valve 22 for controlling the oil flow in the bypass pipe 16 to allow oil to flow through the matrix 14 of the exchanger 12 only when the temperature is below a predetermined threshold. However, since the oil passage cross-section of the bypass pipe 16 is smaller than the oil passage cross-section in the air/oil heat exchanger, overpressure exists in the oil circuit when the matrix 14 of the heat exchanger 12 is frozen. Overpressure induces a risk of damage to the oil circuit 10.

In order to reduce this overpressure, an obvious solution is to increase the flow cross-section of the bypass pipe 16 in order to increase the flow rate without changing the operating pressure conditions of the feed pumps. However, for reasons of space requirements, an increase in the passage cross-section of the bypass pipe 16 is not possible.

The invention more particularly aims at providing a simple, efficient and cost-effective solution to this problem.

To this end, the invention proposes an assembly for a turbine engine comprising an oil circuit including an air/oil heat exchanger, a primary bypass pipe connecting an intake of the air/oil heat exchanger to an outlet of the air/oil heat exchanger and surrounding the air/oil heat exchanger so as to exchange heat with the air/oil heat exchanger, and a secondary bypass pipe of the primary pipe connecting the upstream end of the primary bypass pipe to downstream of the primary bypass pipe, the circuit also comprising at least one valve for controlling the passage of the flow of oil through the primary and secondary bypass pipes and means for controlling the opening of said at least one valve for a temperature below a threshold temperature.

According to the invention, the addition of a secondary bypass pipe allows part of the fluid to be bypassed from the primary bypass pipe, reducing the fluid pressure in the primary bypass pipe under cold operating conditions. The combination of a valve for controlling the flow of oil through the primary and secondary bypass pipes and means for controlling the opening of the valve for a temperature above a threshold temperature makes it possible to operate the primary and secondary bypass pipes only under cold operating conditions, no oil flow circulating through these pipes when the temperature is above the predetermined threshold temperature.

As the pressure drop increases with the decrease in temperature due to the increase in oil viscosity, it is understood that the addition of a secondary bypass pipe is particularly useful. However, this secondary pipe has little impact on the oil heating function of the air/oil exchanger through the primary pipe. For example, a 30% bypass of the oil flow rate from the primary bypass pipe to the secondary bypass pipe allows the same defrosting time to be maintained with the heat exchanger.

According to another characteristic of the invention, the assembly includes a single valve arranged at the outlet of the primary bypass pipe and downstream of the outlet of the secondary bypass pipe. It would of course be possible to have one valve for each of the primary and secondary bypass pipes. However, this obviously complicates the assembly.

In another embodiment, the single valve could be located at the intake of the primary bypass pipe and upstream of the intake of the secondary bypass pipe.

The control valve can be a valve that can adopt at least two positions, a first open position allowing oil to pass through and a second closed position blocking the oil passage. In this way, the threshold temperature is, for example, of the order of 70° C.

In another embodiment, the control valve can be a unidirectional two-way valve that can adopt at least two positions, a first open position allows oil to pass through the valve and a second closed position blocks the oil passage through the valve, but also intermediate positions.

According to another characteristic of the invention, the secondary bypass pipe may be at least ten times shorter than the length of the primary bypass pipe. Also, the circuit includes the secondary branch pipe which can have a diameter at least three times smaller than the diameter of the primary branch pipe.

Having a shorter secondary bypass pipe and/or a smaller diameter than the primary bypass pipe, according to the above-mentioned ratios, allows a good flow distribution between the primary bypass pipe and the secondary bypass pipe in order to lower the pressure drop in the primary pipe while ensuring proper defrosting of the heat exchanger.

In addition, a shorter secondary bypass pipe and/or a smaller diameter according to the above ratios prevents overpressure in the oil circuit when the oil exchanger matrix is frozen without having to increase the cross-section of the primary bypass pipe. This reduces the size and mass of the primary bypass pipe.

A secondary bypass pipe with a shorter length will be preferred due to the induced mass reduction. In addition, it is very advantageous when the intake and outlet are arranged in close proximity to each other. The diameter of the secondary bypass pipe is thus adjusted according to the length of the pipe to ensure a good distribution of the oil flow in the primary and secondary bypass pipes.

The invention also relates to a turbine engine with an oil circuit as described above, in which the oil/air heat exchanger radially delimits a flow surface of a secondary air flow radially outwards.

The invention will be better understood, and other details, characteristics and advantages of the invention will appear upon reading the following description given by way of a non restrictive example while referring to the appended drawings wherein:

FIG. 7 is a perspective schematic view in a radial cross-section, of the assembly of FIG. 6a;

Figure 2:
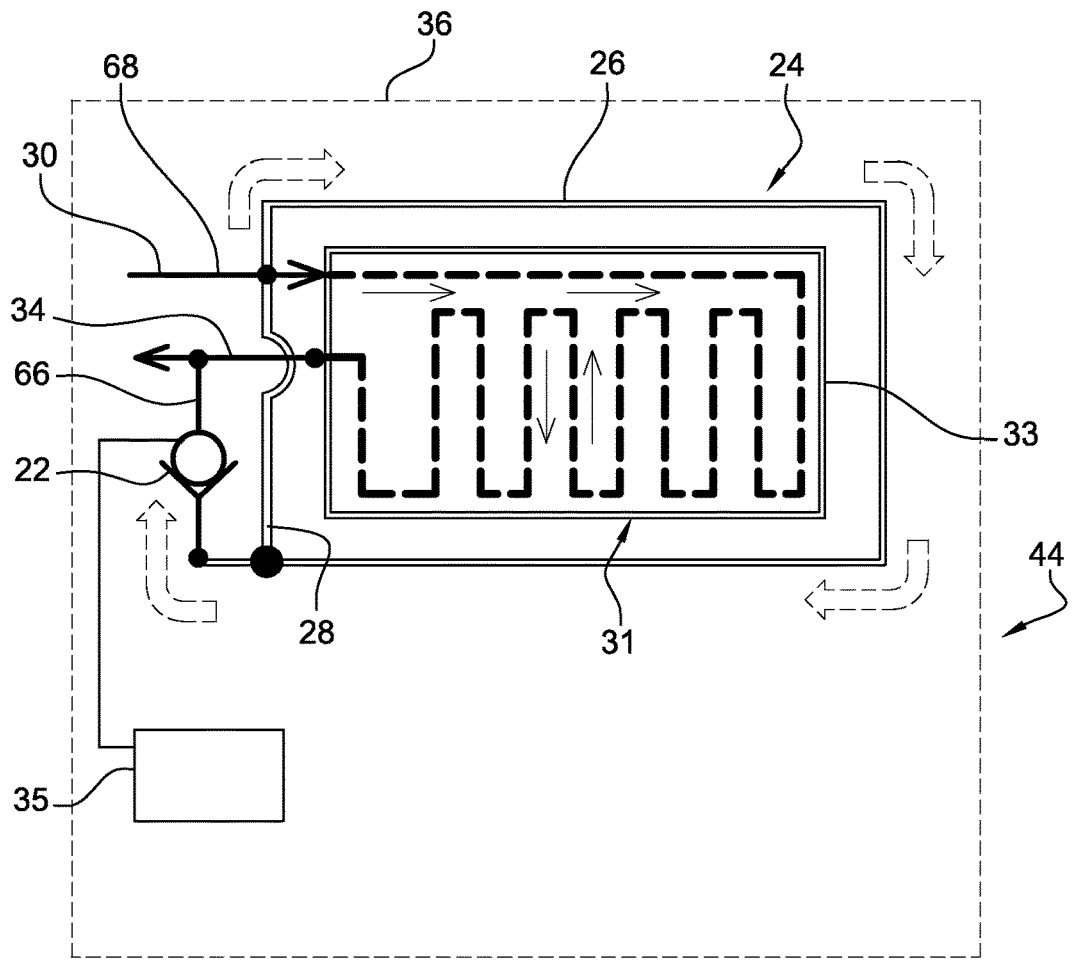
FIG. 2 is a schematic representation of an oil circuit according to the invention, the valve being in an open position.

Reference is made to FIG. 2 which represents an oil circuit 24 according to the invention. In this description, the term exchanger refers to a means that is capable of exchanging heat between two entities. Usually a structural housing surrounds the heat exchanging means, so that the assembly can be called a heat exchanger without the structural housing actively participating in the heat exchange. Thus, it is clear that the invention also covers this type of product.

Figure 1:
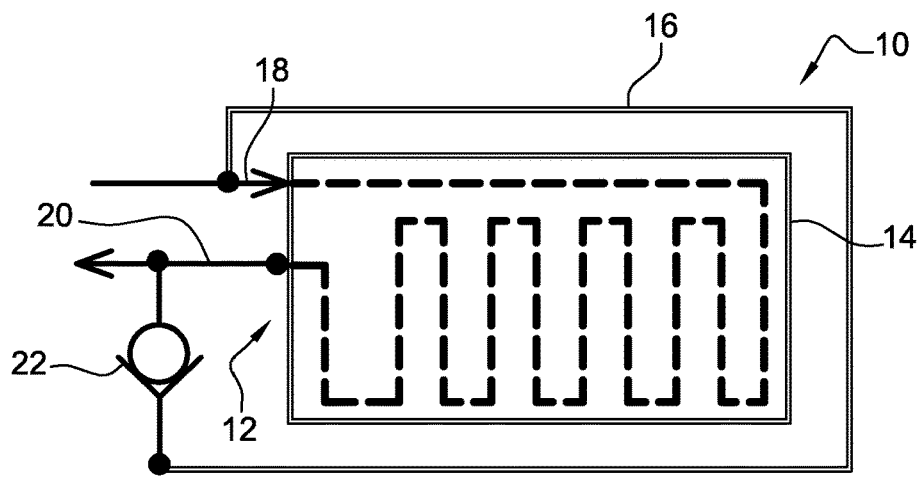
FIG. 1 is a schematic representation of an oil circuit using the previous technique already described above.

As shown in FIG. 2, the oil circuit 24 includes a primary bypass pipe 26 identical to the bypass pipe 16 in FIG. 1 and a secondary bypass pipe 28 that connects the upstream end of the primary bypass pipe 26 to the downstream end of the primary bypass pipe 26. More specifically, the upstream end of the primary bypass pipe 26 and the upstream end of the secondary bypass pipe 28 are connected to each other at the intake of the feed pipe 30 of the heat exchanger 31 or more specifically of the matrix 33 of the heat exchanger 31.

The downstream end of the primary bypass pipe 26 is connected to the intake of a valve 22 the opening/closing of which is controlled by control means 35 authorizing/blocking the flow of fluid through the valve 22 for an oil temperature below a given threshold temperature, for example 70° C. In a particular embodiment of the invention, the means of control of the valve are passive and are made of wax capable of varying in volume according to the surrounding temperature. The volume variation of the wax within the valve allows the oil to selectively pass through the valve or block the oil flow upstream of the valve. The valve outlet 22 is connected to an outlet pipe 34 of the heat exchanger matrix.

In an alternative embodiment (not shown), the valve 22 could be mounted upstream of the upstream end of the primary bypass pipe 26 so as to allow fluid to flow in the primary bypass pipe 26 for a temperature below the threshold temperature and prohibit oil flow for a temperature above the threshold temperature, the oil flow being allowed in the supply pipe 30 of the oil matrix regardless of the temperature. In this configuration, the upstream end of the secondary bypass pipe 28 is connected to the outlet of the valve 22 or downstream of the downstream end of the primary bypass pipe 26.

In yet another embodiment of the invention, it would be possible to use one valve for each primary 26 and secondary 28 bypass pipe, the opening and closing of these valves being simultaneously controlled by the control means.

In the embodiment of FIG. 2, the valve 22 is preferably an on-off unidirectional one-way valve with two positions, one of which allows oil to flow through the primary 26 and secondary 28 bypass pipes and the other prohibits flow through said pipes 26, 28. It would still be possible to use a pilot operated valve with two ports and two positions.

The oil flow in the matrix 33 is represented by the solid pipe arrows in FIG. 2.

Figure 3:
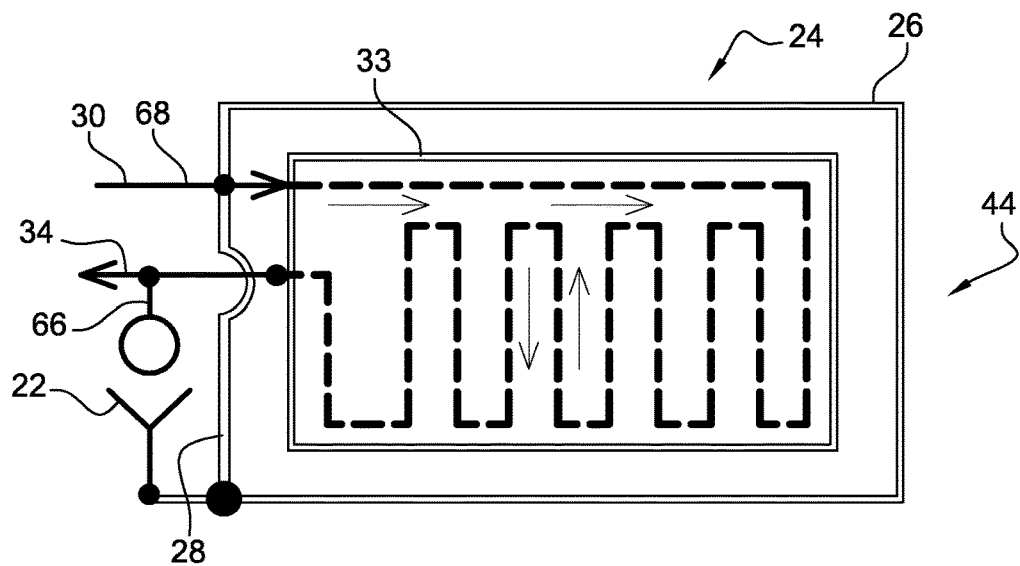
FIG. 3 is a schematic representation of an oil circuit according to the invention, the valve being in a closed position.

According to the invention, when the oil in the matrix 33 is frozen, the oil flows through the primary pipe 26 and the secondary pipe 28 as represented by the dotted arrows in FIGS. 2 and 3.

The dual oil flow in the primary pipe 26 and the secondary pipe 28 increases the flow rate of the moving oil when the matrix 33 is frozen, reducing the overpressure in the oil circuit 24, particularly in the primary pipe for a given oil flow in the supply pipe 34.

Preferably, the secondary pipe 28 has an oil passage cross-section less than or equal to the diameter of the oil passage cross-section of the primary pipe 26 so that the oil flows mainly through the primary pipe 26 and thus ensures that the matrix 33 is defrosted.

Similarly, it is understood that the secondary pipe should be as short as possible to reduce the pressure drop in the primary pipe while ensuring proper defrosting. Thus, for example, the secondary pipe can be defined by a length at least ten times shorter than that of the primary pipe, and/or a diameter three times smaller than the first pipe.

Figure 4:
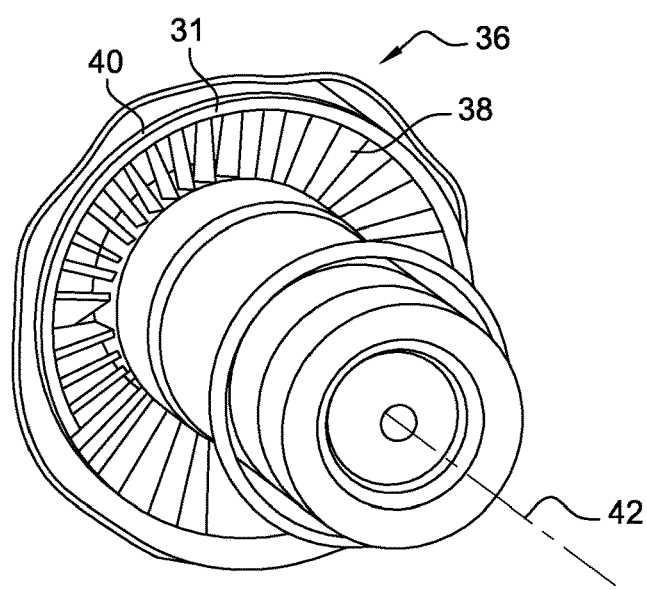
FIG. 4 is a schematic view, in perspective, from downstream, of a turbine engine comprising a heat exchanger according to the invention.
Figure 5:
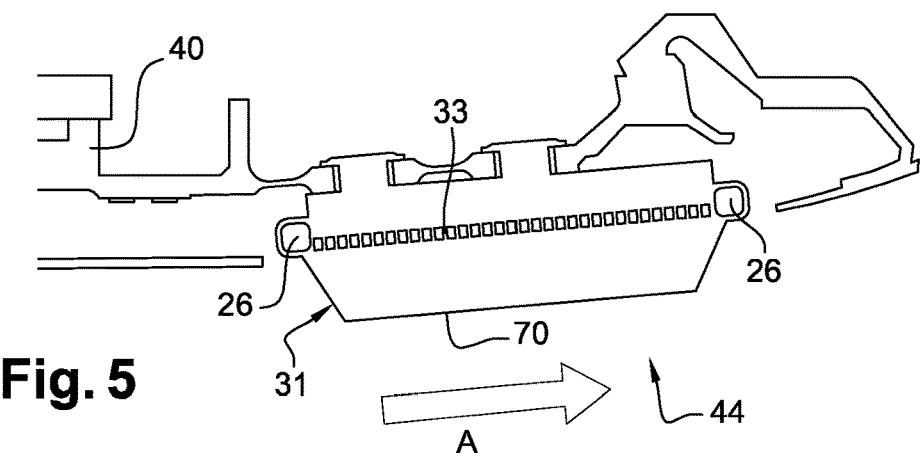
FIG. 5 is a schematic cross-sectional view of the positioning of a heat exchanger, in one path of the turbine engine.

FIG. 4 shows a turbine engine 36 as seen from downstream (in the direction of the air flow) comprising a blower wheel 38 and the air/oil heat exchanger 31 carried by an outer annular housing 40 of the secondary air flow path (arrow A in FIG. 5). As is best seen in FIG. 5, the heat exchanger 31 is carried by the housing 40 and its matrix is arranged to form a radially outer flow surface of the secondary air flow of the turbine engine, i.e. the air flow bypassing the low and high pressure compressors, the combustion chamber and the high and low pressure turbines.

In practice, it is understood that the air/oil heat exchanger 31 is in the form of a ring arranged around the axis 42 of the turbine engine 36.

In the description, the term "secondary pipe" is to be understood as referring to any fluid passage allowing oil to flow between the upstream and downstream ends of the primary pipe.

Thus, in the heat exchanger described above, the secondary pipe can be a simple orifice provided in a wall separating the oil flowing in the supply pipe 30 and the oil flowing in the downstream part of the primary pipe 33.

In one embodiment of the invention, the primary pipe has a diameter of about 12 mm and the secondary pipe is an orifice as indicated in the previous paragraph and has a diameter of 5 mm.

The length of the primary pipe is, in one exemplary embodiment, around several metres.

Figure 6A:
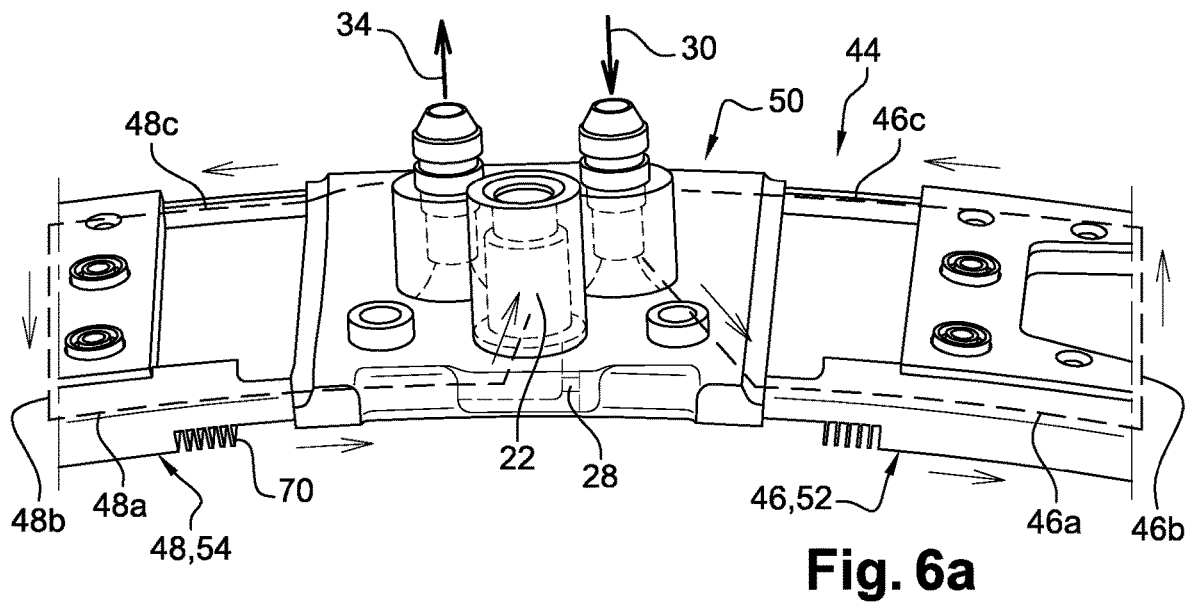
FIG. 6a is a schematic view of an assembly according to the invention.

FIG. 6a represents a set 44 according to the invention comprising a housing formed by a first half ring 46 and a second half ring 48 connected to each other by a central part 50. This assembly 44 includes, as described above, an oil circuit 24 and a heat exchange matrix 33 as well as cooling fins 70 arranged on the radially inner face of the oil matrix 33. The central part includes an oil intake 30 in the matrix 33, an oil outlet 34 of the matrix 33 and the unidirectional valve 22. As described above, the oil intake 30 also supplies the primary pipe 26 and the secondary pipe 28 and the oil outlet 34 is connected to the outlet of the unidirectional valve 22 or more generally to an outlet of the valve 22.

Figure 6B:
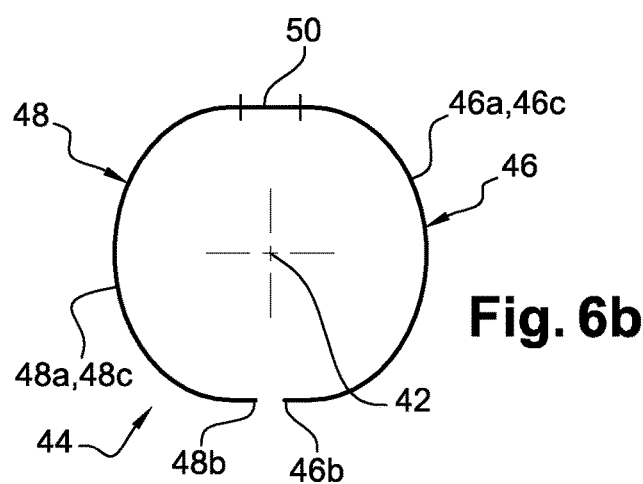
FIG. 6b shows a cross-sectional view of the assembly in a radial plane.

The first half ring 46 comprises a first semi-circular pipe branch 46a and a second semi-circular pipe branch 46c connected to each other by a connecting branch 46b formed at the circumferential end opposite the central part 50 (FIG. 6b). The first branch 46a is formed upstream of the second branch 46c and the connecting branch 46b of the first half ring 46 extends substantially axially. The first branch 46a, the second branch 46c and the connecting branch 46b together form a first part 52 of the primary bypass pipe 26.

The second half ring 48 comprises a first semi-circular pipe branch 48a and a second semi-circular pipe branch 48c connected to each other by a connecting branch 48b formed at the circumferential end opposite the central part 50. The first branch 48a is formed upstream of the second branch 48c and the connecting branch 48b extends substantially axially. The first branch 48a, the second branch 48c and the connecting branch 48b of the second half ring 48 together form a second part 54 of the primary bypass pipe 26. The first part 52 of the primary bypass pipe and the second part 54 of the primary bypass pipe together fully define the primary bypass pipe 26.

Figure 7:
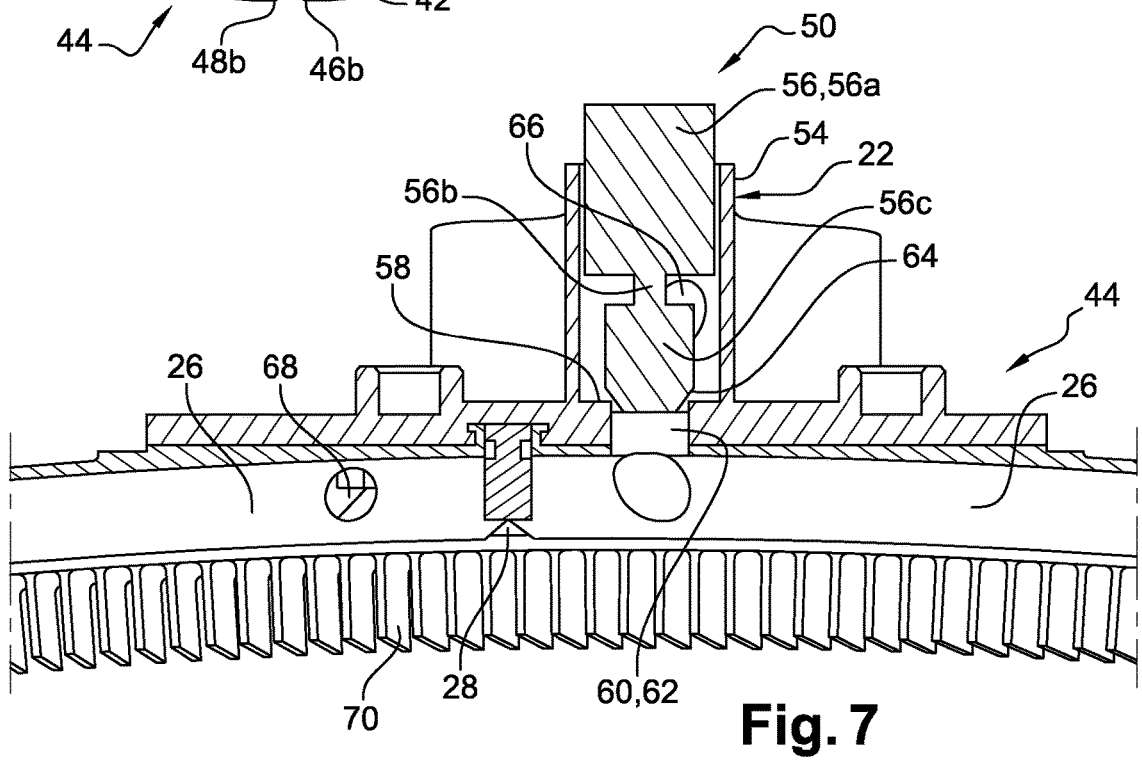

More specifically, as shown in FIG. 7, the central part 50 carries the valve 22 which includes a tubular body 54 in which a piston 56 is slidably mounted between a first support position on a seat 58 closing the oil flow between the outlet 60 of the primary pipe 26 and the outlet 34 of the matrix 33 and a second position in which the piston 56 is remote from the seat 58 and allows the oil flow. The piston 56 comprises a first 56a radially outer part sliding with a seal in the body and connected by a rod 56b to a head 56c of the piston intended to rest on the seat 58 or around the outlet opening 62. This head includes an annular chamfer 64 for the support on the periphery of the orifice 62. When the oil flows through the opening 60, it then flows through the pipe 66 to reach the outlet 34 of the oil matrix 33.

As shown in FIG. 7, the secondary pipe 28 connects the upstream end of the primary pipe 26 to the downstream end of the primary pipe 26. This figure also shows the oil intake port 68 in the primary pipe 26, this port 68 being connected to the oil intake 30 of the matrix 33.

The primary pipe 26 and the secondary pipe 28 are supplied through the oil intake 30 of the matrix 33. The oil in the primary pipe 26 and the secondary pipe 28 then flows to the valve 22, which blocks the oil at the outlet 60 of the primary pipe 26 or allows the oil to escape through the outlet 34 of the oil matrix 33.

The flow in the primary pipe 26 includes in particular, a flow in the first half ring 46 and then in the second half ring 48 before reaching the valve 22. More specifically, the oil flows into the first semi-circular branch 46a, then the connecting branch 46b and finally the second semi-circular branch 46c of the first half ring 46. Once the oil is at the downstream end of the second semi-circular branch 46c of the first half ring 46, the oil then flows into the second half ring 48 at the second semi-circular branch 48c, then at the connecting branch 48b and finally at the first semi-circular branch 48a before reaching the outlet 34 of the oil matrix 33 through the valve 22.

The invention claimed is:

1. An assembly for a turbine engine, comprising an oil circuit including an air/oil heat exchanger, a primary bypass pipe connecting an intake of the air/oil heat exchanger to an outlet of the air/oil heat exchanger and surrounding the air/oil heat exchanger so as to exchange heat with the air/oil heat exchanger and a secondary bypass pipe of the primary bypass pipe connecting an upstream end of the primary bypass pipe to a downstream end of the primary bypass pipe, the oil circuit also comprising at least one valve for controlling the passage of a flow of oil into the primary and secondary bypass pipes and means for controlling the opening of said at least one valve for a temperature lower than a threshold temperature, said secondary bypass pipe) having a length at least ten times shorter than a length of the primary bypass pipe.

2. The assembly according to claim 1, wherein the at least one valve is a single valve arranged at an outlet of the primary bypass pipe and downstream of an outlet of the secondary bypass pipe.

3. The assembly according to one of claim 1, wherein the at least one valve is a valve capable of adopting at least two positions, a first open position of which allows the passage of oil and a second closed position blocks the passage of oil through the valve.

4. The assembly according to claim 1, wherein the threshold temperature is 70° C.

5. The assembly according to claim 1, wherein the at least one valve is a unidirectional two-way valve.

6. The assembly according to claim 1, wherein a diameter of the secondary bypass pipe is at least three times smaller than a diameter of the primary bypass pipe.

7. A turbine engine comprising the assembly according to claim 1, wherein the oil/air heat exchanger radially outwardly delimits a discharge surface of a secondary air flow.

* * * * *